(12) United States Patent
Repasi et al.

(10) Patent No.: US 8,307,276 B2
(45) Date of Patent: Nov. 6, 2012

(54) DISTRIBUTED CONTENT VERIFICATION AND INDEXING

(75) Inventors: Rolf Repasi, Sunrise Beach (AU); Simon Clausen, New South Wales (AU)

(73) Assignee: Symantec Corporation, Mountain View, CA (US)

( * ) Notice: Subject to any disclaimer, the term of this patent is extended or adjusted under 35 U.S.C. 154(b) by 1248 days.

(21) Appl. No.: 11/803,923

(22) Filed: May 16, 2007

(65) Prior Publication Data

US 2007/0288696 A1    Dec. 13, 2007

Related U.S. Application Data

(60) Provisional application No. 60/801,895, filed on May 19, 2006, provisional application No. 60/842,812, filed on Sep. 7, 2006.

(51) Int. Cl.
*G06F 17/00* (2006.01)
(52) U.S. Cl. .................. 715/234; 715/241; 707/711
(58) Field of Classification Search .................. 715/200; 726/22–30; 707/706–712
See application file for complete search history.

(56) References Cited

U.S. PATENT DOCUMENTS

| | | | | |
|---|---|---|---|---|
| 5,706,365 A * | 1/1998 | Rangarajan et al. | .......... | 707/728 |
| 6,510,425 B1 * | 1/2003 | Okamoto et al. | ...................... | 1/1 |
| 6,519,597 B1 * | 2/2003 | Cheng et al. | ........................... | 1/1 |
| 6,571,256 B1 * | 5/2003 | Dorian et al. | ...................... | 726/2 |
| 7,114,177 B2 * | 9/2006 | Rosenberg et al. | ................ | 726/4 |
| 7,185,360 B1 * | 2/2007 | Anton et al. | ....................... | 726/3 |
| 7,293,293 B2 * | 11/2007 | Lee et al. | ........................... | 726/30 |
| 7,313,691 B2 * | 12/2007 | Bantz et al. | ..................... | 713/155 |
| 7,363,364 B2 * | 4/2008 | Sankaran et al. | ............. | 709/223 |
| 7,380,202 B1 * | 5/2008 | Lindhorst et al. | ............. | 715/204 |
| 7,496,834 B2 * | 2/2009 | Jeon et al. | ....................... | 715/234 |
| 7,543,055 B2 * | 6/2009 | Kohn | ............................ | 709/224 |
| 7,562,304 B2 * | 7/2009 | Dixon et al. | .................... | 715/738 |
| 7,613,992 B1 * | 11/2009 | Raichur et al. | ................. | 715/201 |
| 7,809,823 B2 * | 10/2010 | Sankaran et al. | ............. | 709/223 |
| 7,831,824 B2 * | 11/2010 | Abdulhayoglu | .............. | 713/156 |
| 7,930,400 B1 * | 4/2011 | Fox et al. | ....................... | 709/226 |
| 2002/0059364 A1 * | 5/2002 | Coulthard et al. | ............ | 709/203 |
| 2003/0145197 A1 * | 7/2003 | Lee et al. | ....................... | 713/155 |
| 2004/0039992 A1 * | 2/2004 | Jeon et al. | ...................... | 715/513 |
| 2007/0288696 A1 * | 12/2007 | Repasi et al. | .................. | 711/135 |
| 2008/0018925 A1 * | 1/2008 | Smithson | ..................... | 358/1.13 |
| 2010/0077098 A1 * | 3/2010 | Fox et al. | ...................... | 709/233 |

* cited by examiner

*Primary Examiner* — Doug Hutton
*Assistant Examiner* — Benjamin Smith
(74) *Attorney, Agent, or Firm* — Holland & Hart LLP (57) ABSTRACT

A method of verifying content, for example webpage content, including receiving, at an indexing system (100), a first copy (240) of a document (220) from a hosting server (210), then processing the first copy (240) to obtain first indicating data including one or more properties of the first copy (240). Also obtaining second indicating data, the second indicating data obtained by processing a second copy (255) of the document (220) from the hosting server (210), the second copy (255) received by a client terminal (250), the second indicating data including one or more properties of the second copy (255). Then the first indicating data and the second indicating data can be compared, and the first copy (240) of the document (220) received by the indexing system (100) can be determined to be verified or not verified based on a comparison between the first indicating data and the second indicating data.

14 Claims, 8 Drawing Sheets

DISTRIBUTED CONTENT VERIFICATION AND INDEXING

CROSS-REFERENCE TO RELATED APPLICATION(S)

This application claims the benefit of priority from Provisional Application Ser. No. 60/801,895, filed on May 19, 2006 and 60/842,812, filed Sep. 7, 2006, which are hereby incorporated by reference in their entirety.

TECHNICAL FIELD

The present invention generally relates to the field of computing and malicious software or software threats, and more particularly to a method, system and/or computer program product for verifying distributed content, such as webpage content, and/or indexing the content, such as indexing the content of a webpage.

BACKGROUND ART

Webpage content indexing systems, commonly known as "crawlers", require high-bandwidth connections and usually reside on a static IP address or subnet. This allows websites containing malicious content or malicious software to spoof or misrepresent the website content, thereby potentially confusing users and/or a webpage content indexing system. Such websites can also potentially exploit a ranking mechanism employed by a content indexing system, for example allocating the website a higher search result ranking when a user performs an Internet search than the website correctly deserves.

As used herein a "threat" includes malicious software, also known as "malware" or "pestware", which includes software that is included or inserted in a part of a processing system for a harmful purpose. The term threat should be read to include possible, potential and actual threats. Types of malware can include, but are not limited to, malicious libraries, viruses, worms, Trojans, adware, malicious active content and denial of service attacks. In the case of invasion of privacy for the purposes of fraud or theft of identity, malicious software that passively observes the use of a computer is known as "spyware".

A hash function (i.e. Message Digest, eg. MD5) can be used for many purposes, for example to establish whether a file transmitted over a network has been tampered with or contains transmission errors. A hash function uses a mathematical rule which, when applied to a file, generates a hash value, i.e. a number, usually between 128 and 512 bits in length. This number is then transmitted with the file to a recipient who can reapply the mathematical rule to the file and compare the resulting number with the original number.

A crawler could also be termed a robot or a spider, and is a program that automatically explores the world wide web by retrieving a document and recursively retrieving at least some of the documents referenced within the document. Different algorithms are used to select which particular references to follow and depend on the purpose of the program. Crawlers can be used to build an index of referenced documents or may simply seek to validate references in a document.

An index can be used to allow relatively quick searching based on, for example, text, keyword, or a variety of other search mechanisms, to locate documents in a database. Particular properties of documents may be indexed in a database to facilitate retrieval and/or searching. The action of updating the index is commonly referred to as indexing.

A cryptographic hash is a mathematical function used to map values from a large domain into a smaller domain. A cryptographic hash is normally a one-way function as it is computationally infeasible to find any input which maps to a known output. A cryptographic hash is normally collision-free as it is computationally infeasible to locate any two distinct inputs which map to produce the same output.

In a networked information or data communications system, a user has access to one or more terminals which are capable of requesting and/or receiving information or data from local or remote information sources. In such a communications system, a terminal may be a type of processing system, computer or computerized device, personal computer (PC), mobile, cellular or satellite telephone, mobile data terminal, portable computer, Personal Digital Assistant (PDA), pager, thin client, or any other similar type of digital electronic device. The capability of such a terminal to request and/or receive information or data can be provided by software, hardware and/or firmware. A terminal may include or be associated with other devices, for example a local data storage device such as a hard disk drive or solid state drive.

An information source can include a server, or any type of terminal, that may be associated with one or more storage devices that are able to store information or data, for example in one or more databases residing on a storage device. The exchange of information (ie. the request and/or receipt of information or data) between a terminal and an information source, or other terminal(s), is facilitated by a communication means. The communication means can be realized by physical cables, for example a metallic cable such as a telephone line, semi-conducting cables, electromagnetic signals, for example radio-frequency signals or infra-red signals, optical fibre cables, satellite links or any other such medium or combination thereof connected to a network infrastructure.

There is a need for a method, system and/or computer program product which addresses or at least ameliorates one or more problems inherent in the prior art.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavor to which this specification relates.

DISCLOSURE OF INVENTION

In a first broad form there is provided a method of verifying content, the method including the steps of: receiving, at an indexing system, a first copy of a document from a hosting server; processing the first copy to obtain first indicating data including one or more properties of the first copy; obtaining second indicating data, the second indicating data obtained by processing a second copy of the document from the hosting server, the second copy received by a client terminal, the second indicating data including one or more properties of the second copy; and, determining the first copy of the document received by the indexing system to be verified or not verified based on a comparison between the first indicating data and the second indicating data.

In a second broad form there is provided a system for verifying content, including at least one processing system to: receive a first copy of a document from a hosting server; process the first copy to obtain first indicating data including one or more properties of the first copy; obtain second indicating data, the second indicating data obtained by processing a second copy of the document from the hosting server, the second copy received by a client terminal, the second indicating data including one or more properties of the second copy; and, determine the first copy to be verified or not verified based on a comparison between the first indicating data and the second indicating data.

In a particular non-limiting example, the content is webpage content and the document is a webpage.

In a third broad form there is provided a computer program product for verifying webpage content, the computer program product executable on a processing system and configured to: receive a first copy of a webpage; process the first copy to obtain first indicating data including one or more properties of the first copy; obtain second indicating data, the second indicating data obtained from a second copy of the webpage, the second indicating data including one or more properties of the second copy; and, determine the first copy to be verified or not verified based on a comparison between the first indicating data and the second indicating data.

In a fourth broad form the present invention provides a method of verifying webpage content, the method including the steps of: receiving, at an indexing system, a copy of a webpage from a client terminal, the client terminal having received the copy of the webpage from a hosting server; and, determining if part of the copy of the webpage received from the client terminal is invalid, and if so, removing the invalid part of the copy of the webpage received from the client terminal to provide verified webpage content.

According to a fifth broad form there is provided a computer program product for verifying webpage content, the computer program product configured to: receive, at an indexing system, a copy of a webpage from a client terminal, the client terminal having received the copy of the webpage from a hosting server; and, determine if part of the copy of the webpage received from the client terminal is invalid, and if so, remove the invalid part of the copy of the webpage received from the client terminal to provide verified webpage content.

Preferably, though not necessarily, if determined to be verified, the contents of the first copy of the webpage can be processed to index the first copy of the webpage.

In a particular form, the first indicating data can also include an index of the contents of the first copy of the webpage and the index is considered verified if the first copy is verified.

In another form, if the first copy of the webpage is not verified, the method may further include receiving and comparing further second indicating data from a further client terminal, and determining the first copy of the webpage received by the indexing system to be verified or not verified based on the number of non-matching properties between the first indicating data and the further second indicating data.

In various forms, the first indicating data, the second indicating data and the further second indicating data preferably include one or more properties of a webpage. Optionally, the first indicating data, the second indicating data and the further second indicating data may include indexed contents of the webpage. That is, indicating data may include only one or more properties of a webpage, may include only indexed contents, or may include both one or more properties or a webpage and indexed contents of a webpage.

According to another non-limiting example, if the first copy is not verified, the method includes obtaining further indicating data, the further indicating data obtained by processing a further copy of the webpage, the further copy received by a further client terminal, the further indicating data including one or more properties of the further copy, and further determining the first copy of the webpage received by the indexing system to be verified or not verified based on a comparison between the first indicating data and the further indicating data.

According to further example aspects, the first indicating data or the second indicating data are at least partially obtained by one or more of: performing natural language analysis; performing word frequency analysis; performing a word hash; performing a word group hash; performing content comparisons; performing keyword density analysis; and performing readability analysis.

According to yet further example aspects, the one or more properties of the first copy or the second copy at least partially include one or more of the group: partial contents of a webpage; complete contents of a webpage; links to other webpages; a check sum of the webpage; a cryptographic hash of the webpage; and a frequency of at least one keyword within the webpage.

According to other forms, the present invention provides a computer program product and/or a system embodying or giving effect to the aforementioned methods.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

Processing System

Figure 1:
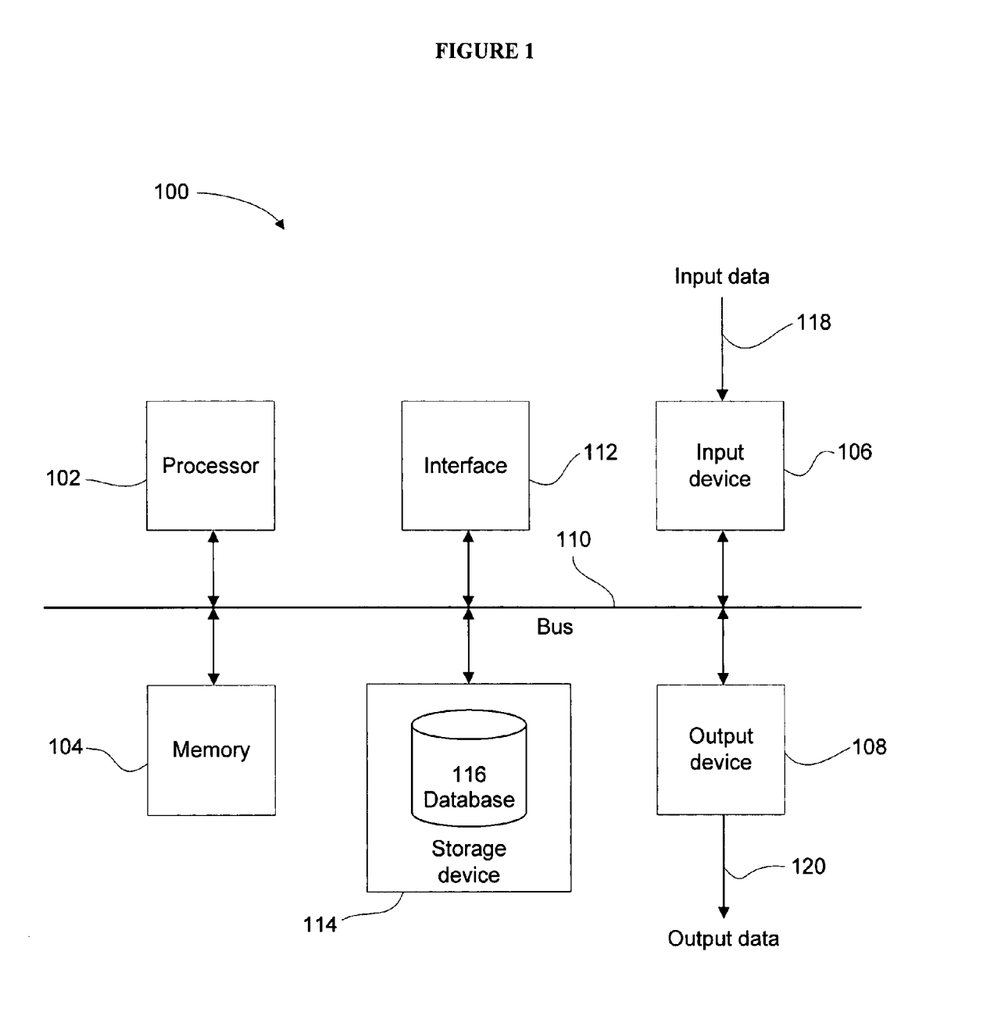
FIG. 1 illustrates a functional block diagram of an example processing system that can be utilized to embody or give effect to a particular embodiment.

A particular embodiment of the present invention can be realized using a processing system, an example of which is shown in FIG. 1. In particular, the processing system 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could include more than one distinct processing device, for example to handle different functions within the processing system 100.

Input device 106 receives input data 118 and can include, for example, a keyboard, a pointer device such as a pen-like device or a mouse, audio receiving device for voice controlled activation such as a microphone, data receiver or antenna such as a modem or wireless data adapter, data acquisition card, etc. Input data 118 could come from different sources, for example keyboard instructions in conjunction with data received via a network. Output device 108 produces or generates output data 120 and can include, for example, a display device or monitor in which case output data 120 is visual, a printer in which case output data 120 is printed, a port for example a USB port, a peripheral component adapter, a data transmitter or antenna such as a modem or wireless network adapter, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In a particular embodiment, input data 118 can be a downloaded file, webpage, webpage properties or part of webpage, and output data 120 can be indicating data, an indication of verification or otherwise, and/or an indication or representation of indexed contents of a verified webpage or part thereof.

In use, the processing system 100 is adapted to allow data or information to be stored in and/or retrieved from, via wired or wireless communication means, the at least one database 116. The interface 112 may allow wired and/or wireless communication between the processing unit 102 and peripheral components that may serve a specialized purpose. More than one input device 106 and/or output device 108 can be provided. It should be appreciated that the processing system 100 may be any form of terminal, server, specialized hardware, or the like.

The processing system 100 may be a part of a networked communications system. Processing system 100 could connect to a network, for example the Internet or a WAN. Input data 118 and output data 120 could be received from or communicated to other devices, such as a server, client or webpage hosting server, via the network. The network may form part of, or be connected to, the Internet, and may be or form part of other communication networks, such as LAN, WAN, ethernet, token ring, FDDI ring, star, etc., networks, or mobile telephone networks, such as GSM, CDMA or 3G, etc., networks, and may be wholly or partially wired, including for example optical fibre, or wireless networks, depending on a particular implementation.

Verifying Webpage Content

Figure 2:
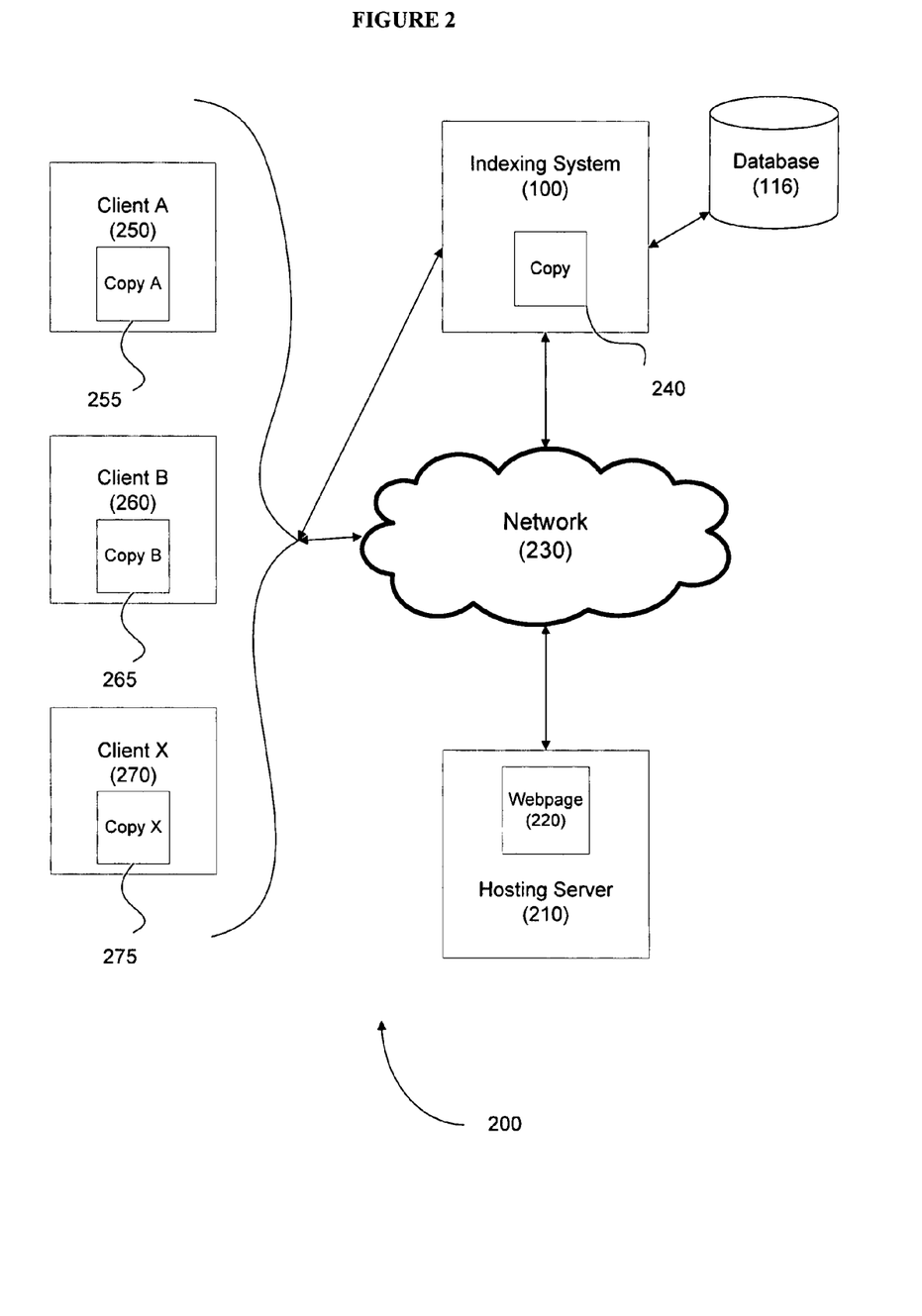
FIG. 2 illustrates an example overview system.

Referring to FIG. 2, there is illustrated a system 200 for verifying webpage content. An indexing system, for example processing system 100, is associated with database 116. Hosting server 210, which may be one or more servers or processing systems, stores webpage 220. Indexing system 100 receives a copy 240 (i.e. first copy) of webpage 220 from hosting server 210 via network 230. Indexing system 100 seeks to ascertain whether or not first copy 240 is an accurate or true copy of webpage 220, that is, to verify or not verify first copy 240.

First copy 240 is processed, either at indexing system 100 or at some other processing system (not illustrated), to obtain first indicating data which includes one or more properties of copy 240 of webpage 220. However, indexing system 100 cannot be certain that copy 240 is a true copy of webpage 220. Hosting server 210 may intentionally alter the transmitted representation or copy of webpage 220, webpage 220 may include malicious software or content, or webpage 220 may be part of a malicious website that intentionally misrepresents the content of webpage 220.

In assisting to verify the accuracy of copy 240 to be a true copy of webpage 220, indexing system 100 obtains second indicating data from a second copy 255 of the webpage 220, the second copy 255 received by a client terminal 250. The second indicating data can be obtained in a variety of ways, for example by processing of the second copy 255 at the client terminal 250 and/or processing of the second copy 255 at the indexing system 100, or some other processing system.

According to a particular example, indexing system 100 receives the second indicating data from one or more client terminals, for example client A 250, client B 260 and/or client X 270, where any number of client terminals can be utilized. The second indicating data is obtained from a second copy of webpage 220 received by or already residing on client A 250, client B 260 or client X 270. Copy A 255, copy B 265 or copy X 275 can be processed at client A 250, client B 260 or client X 270, respectively, and/or copy A 255, copy B 265 or copy X 275 can be transferred for processing at indexing system 100 to generate second indicating data by indexing system 100. Second indicating data, whether generated by client A 250, client B 260, client X 270 or indexing system 100 includes one or more properties of copy A 255, copy B 265 or copy X 275 of webpage 220.

Indexing system 100 can then compare the first indicating data and the second indicating data and determine if first copy 240 of webpage 220 received by indexing system 100 is verified or is not verified based on a number of non-matching (and/or matching) properties between the first indicating data and the second indicating data.

The second indicating data may be obtained solely from a single client terminal, for example client A 250 and thus rely on copy A 255. Optionally, whether or not copy 240 of webpage 220 is verified or not, further second indicating data can be obtained from one or more further client terminals, for example client B 260 or client X 270, so as to obtain further second indicating data, based on copy B 265, copy X 275, etc. Such further second indicating data can be used as confirmation of verification, or to provide verification if verification is not obtained using client A 250, by comparing the further second indicating data with the first indicating data.

If copy 240 is determined to be verified after a comparison of the first indicating data and the second indicating data and/or further second indicating data, the contents of copy 240 of webpage 220 can be indexed, as copy 240 is assumed to be a true copy of webpage 220. Indexed contents can then be stored in database 116.

It should also be noted that client A 250, client B 260 or client X 270 could communicate directly with indexing system 100 and/or could communicate via network 230. Also as illustrated, each client terminal 250, 260, 270 can obtain a copy of webpage 220 via network 230. The copy stored by each client terminal 250, 260, 270 could be obtained before or after indexing system 100 obtains copy 240.

Figure 3:
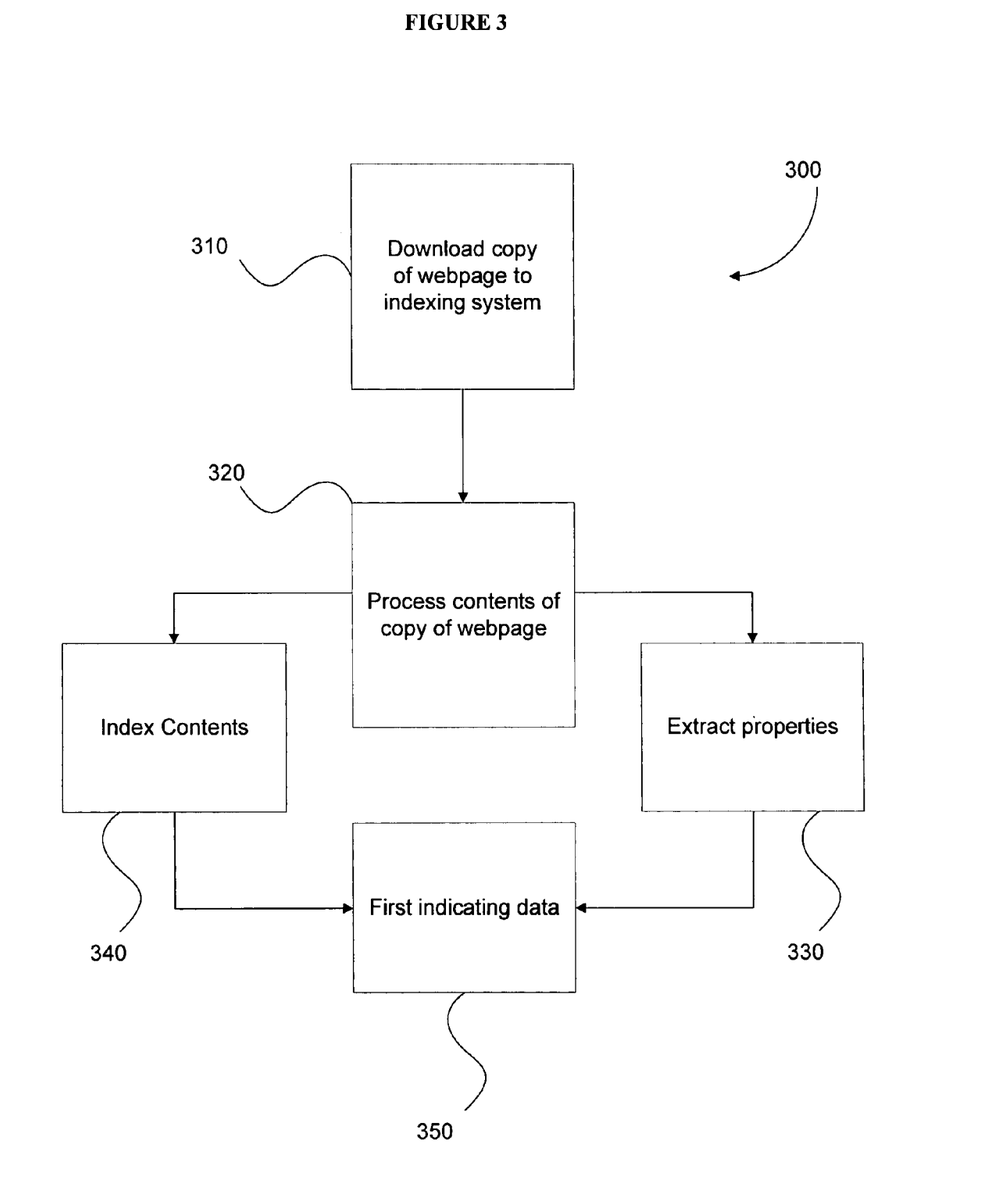
FIG. 3 illustrates a flow diagram of an example method of obtaining first indicating data.

Referring to FIG. 3, there is illustrated a method 300 for obtaining first indicating data. At step 310, copy 240 of webpage 220 is downloaded to indexing system 100. At step 320 indexing system 100, or some other processing system in communication with indexing system 100, processes the contents of copy 240. Processing includes extracting one or more properties of webpage copy 240 at step 330. Additionally or alternatively, processing can include indexing the contents of copy 240 at step 340. It should be realized that step 330 or step 340 need not both be required to be performed, that is either could occur, to produce first indicating data at step 350.

Figure 4:
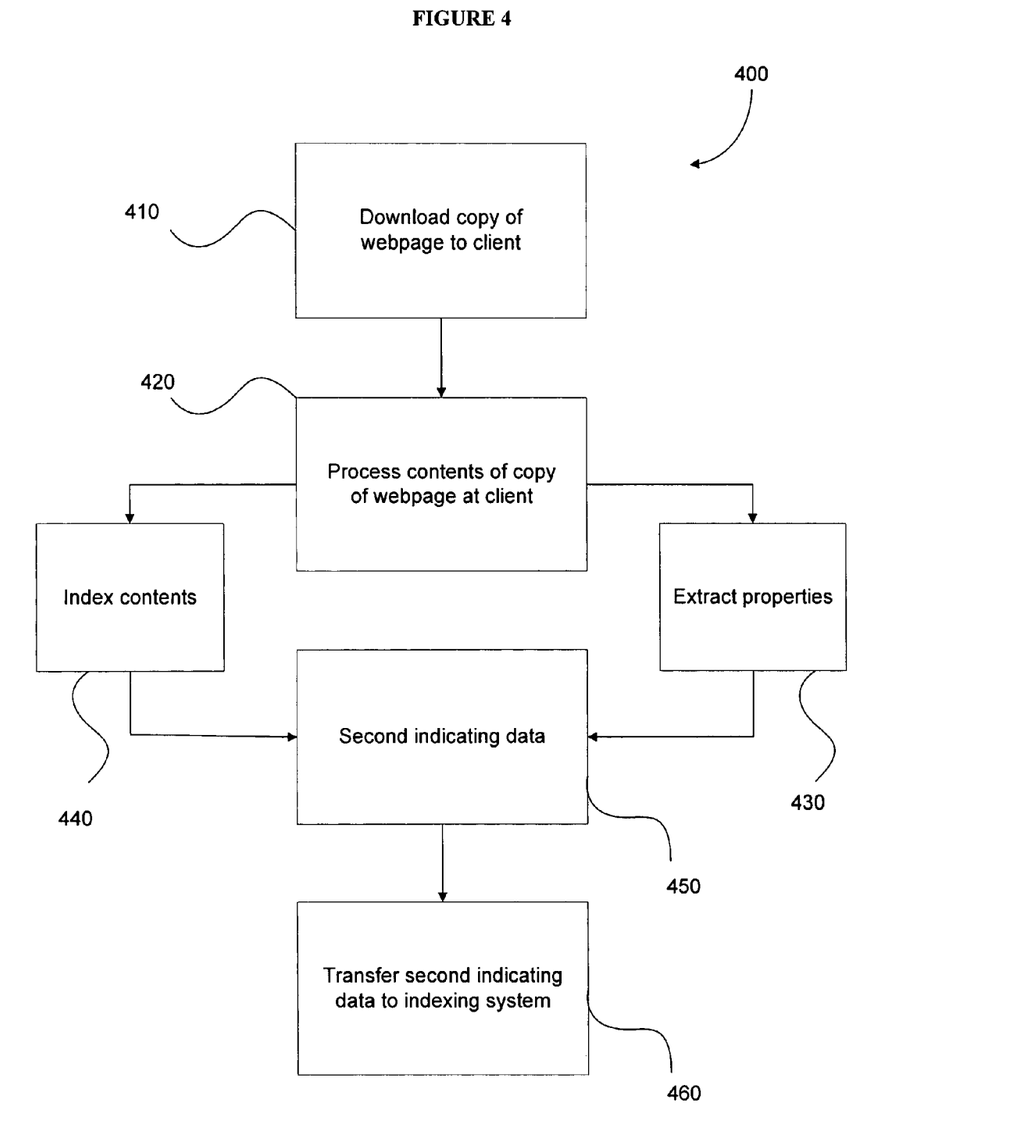
FIG. 4 illustrates a flow diagram of an example method of obtaining second indicating data.

Referring to FIG. 4, there is illustrated a method 400 to obtain second indicating data. Copy A 255 (i.e. second copy) of webpage 220 is downloaded to client terminal A 250 at step 410. At step 420 the contents of copy A 255 can be processed at client A 250. Processing can include extracting properties of copy A 255 at step 430 and/or indexing contents of copy A 255 at step 440, similarly as for steps 330 or 340 in FIG. 3. At step 450 second indicating data is generated at client A 250. Second indicating data is then transferred from client A 250 to indexing system 100 at step 460.

Figure 5:
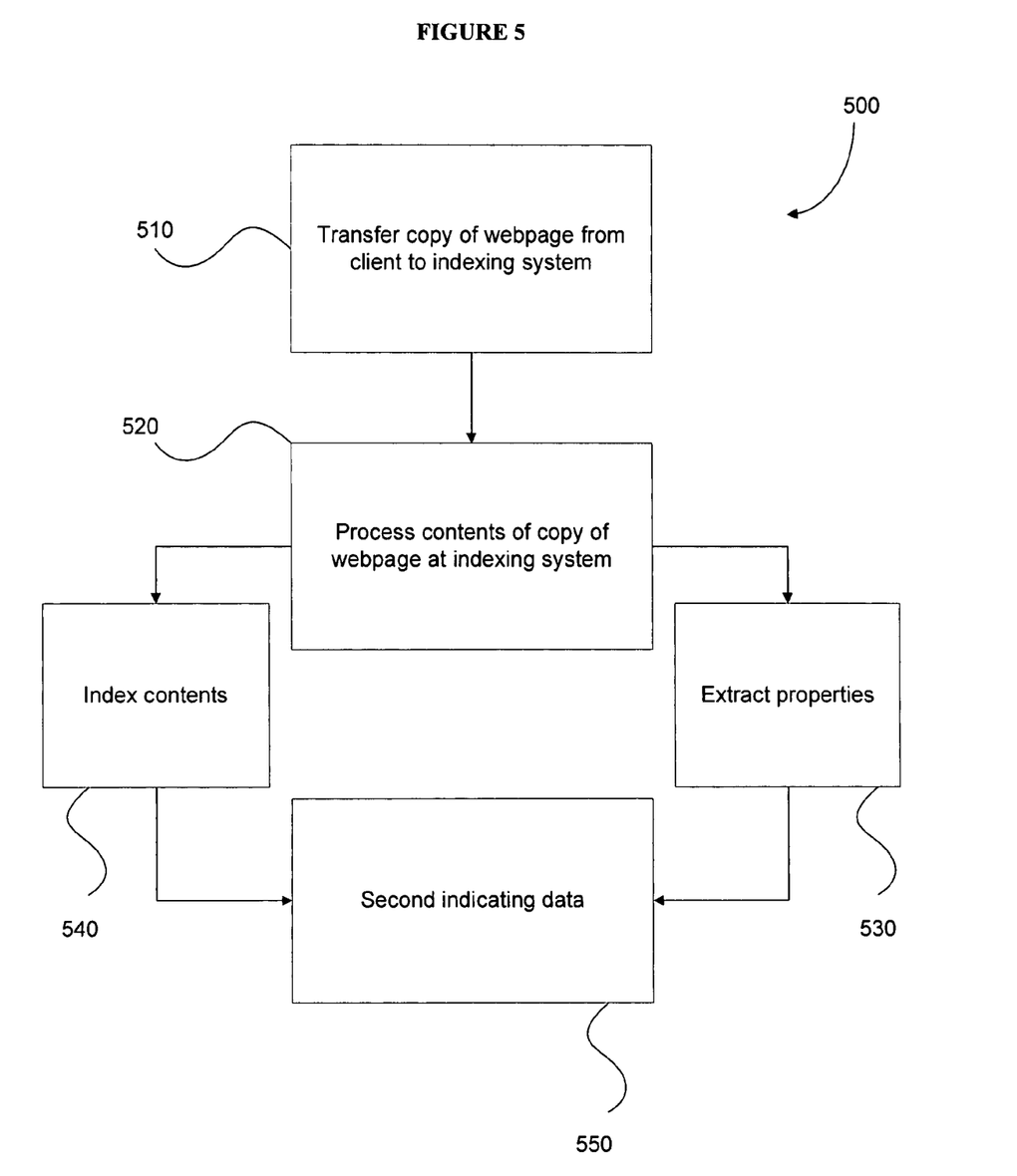
FIG. 5 illustrates a flow diagram of an alternate example method of obtaining second indicating data.

Referring to FIG. 5, there is illustrated an alternate method 500 to obtain second indicating data. At step 510, copy A 255 (i.e. second copy) of webpage 220 is transferred from client A 250 to indexing system 100. At step 520, copy A 255 is processed at indexing system 100. As previously mentioned, step 530 to extract one or more properties of copy A 255 and/or indexing of contents of copy A 255 at step 540 can be performed to produce second indicating data at step 550.

Figure 6:
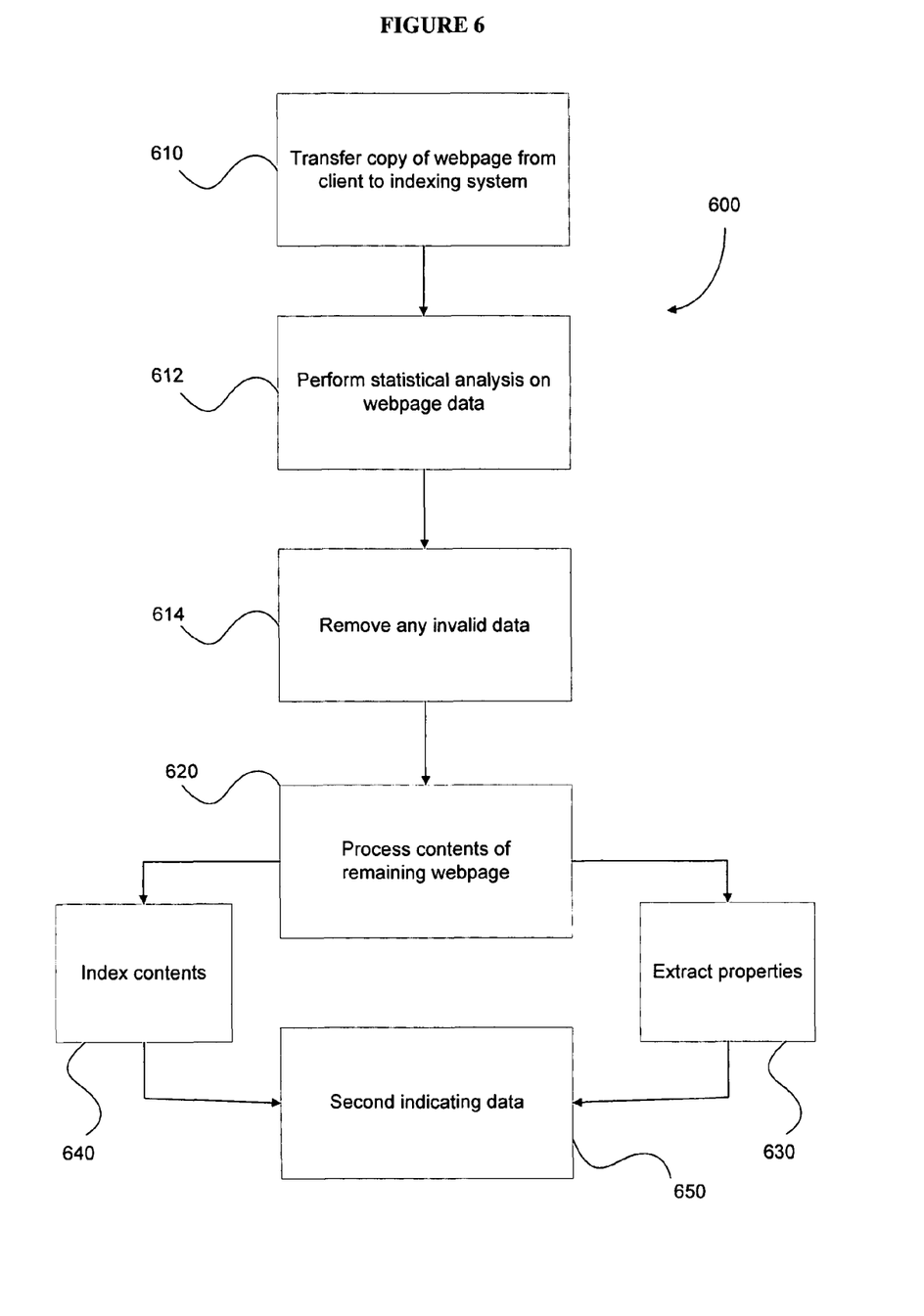
FIG. 6 illustrates a flow diagram of an alternate example method of obtaining second indicating data.

Referring to FIG. 6, there is illustrated an alternate method 600 for obtaining second indicating data. At step 610, copy A 255 (i.e. second copy) of webpage 220 is transferred from client A 250 to indexing system 100. At step 612, statistical analysis on webpage data based on copy A 255 received at indexing system 100 is performed. Statistical analysis may include, but should not be considered to be limited to: natural language analysis, i.e. word/term frequency analysis; word/word group hash or content comparisons; keyword density analysis; and/or readability analysis.

At step 614, any determined invalid data or contents can be removed from copy A 255 at indexing system 100. At step 620, the contents or data of the remaining webpage can be processed. As previously, then processing can occur to extract one or more properties of the remaining webpage at step 630 and/or index the contents of the remaining webpage at step 640. At step 650, second indicating data can thus be obtained from the remaining webpage, which is based on the contents of copy A 255 received at indexing system 100 after any invalid data or content has been removed from copy A 255.

Figure 7:
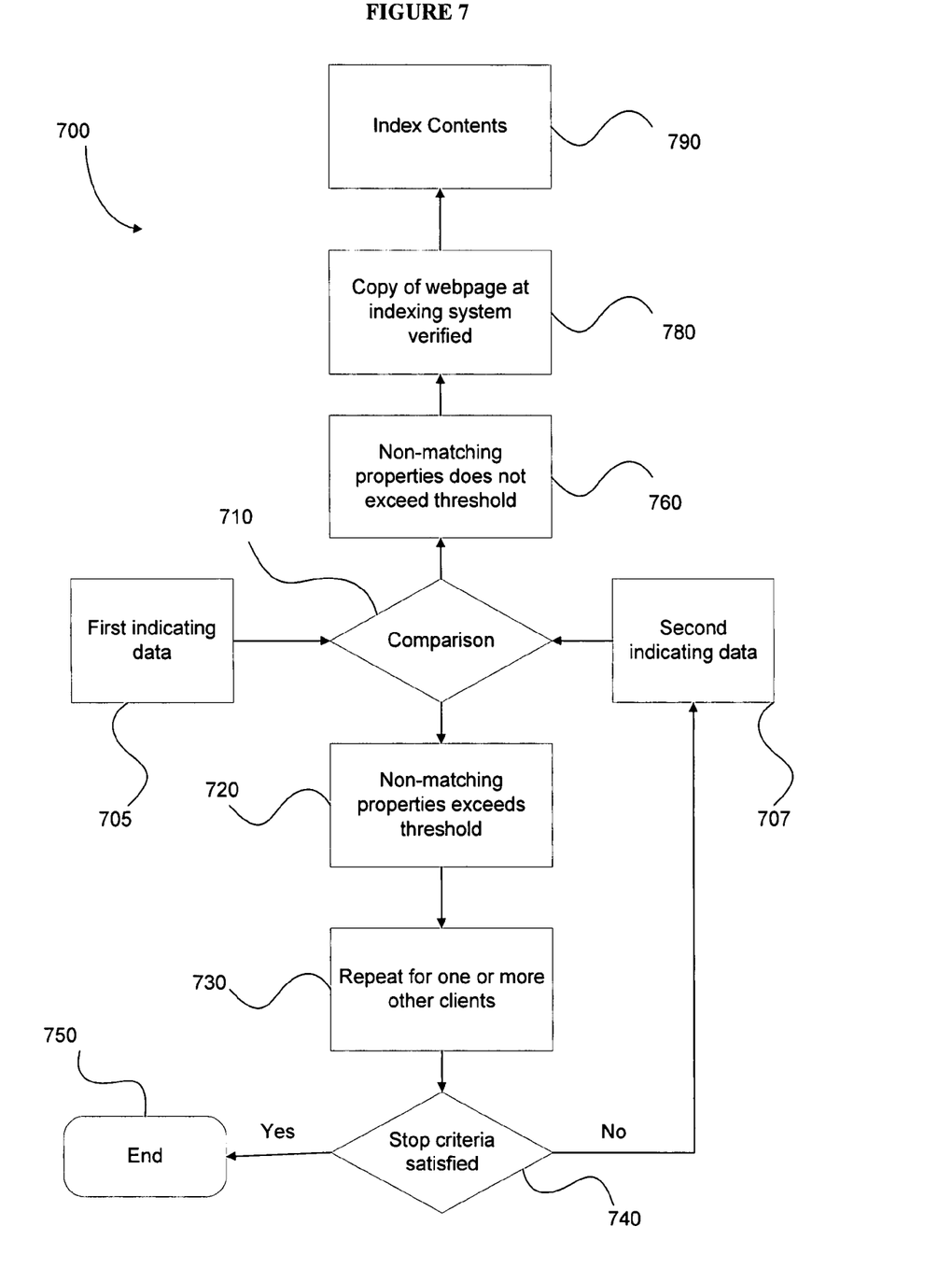
FIG. 7 illustrates a flow diagram of an example method of verifying a first copy of a webpage.

Referring to FIG. 7, there is illustrated a method 700 for verifying a copy of a webpage once first indicating data and second indicating data have been obtained. At step 710, a comparison is made between first indicating data 705 and second indicating data 707. First indicating data 705 can be obtained using method 300. Second indicating data 707 can be obtained using method 400, 500 or 600. At step 710, the comparison could be made between one or more properties of a copy of a webpage, the one or more properties forming at least part of first indicating data 705 and second indicating data 707. At step 720, the number of non-matching properties, or alternatively the number of matching properties, between first indicating data 705 and second indicating data 707 is determined or checked to see if a threshold, which may be a preselected threshold or a dynamic threshold, has been exceeded. If the number of non-matching properties exceeds the threshold then first indicating data 705, obtained at step 350, can be assumed to represent copy 240 which is not an accurate copy of webpage 220 on hosting server 210. Thus, it can be assumed copy 240 is not verified.

At step 730, a determination of copy 240 not being verified can be confirmed by repeating the obtaining of second indicating data 707 from another client terminal, for example client B 260, . . . , client X 270, etc. Thus, second indicating data 707 can be redetermined based on copy B 265, copy X 275, etc., using either of the methods 400, 500 or 600. This can be used as backup or assurance that the first determination of verification or otherwise of copy 240 is accurate.

At step 740, various stop criteria could be set and checked if satisfied so as to exit repeating step 730. For example, a number of verification steps could be selected, that is only a certain number of other client terminals could be queried, or a set amount of time could be used. If the stop criteria is satisfied, comparison method 700 can end at step 750 and thus copy 240 has been determined as a non-verified copy of webpage 220. If the stop criteria is not yet satisfied at step 740 further second indicating data 707 is obtained and comparison step 710 repeated.

At step 760, if the number of non-matching properties does not exceed the threshold then copy 240 of webpage 220 is deemed to be verified at step 780. At step 790, contents of copy 240 could then be indexed and stored in database 116.

VARIOUS EMBODIMENTS

Other embodiments of the present invention are possible. In an alternate form, indexing system 100 can receive copy 240 of webpage 220 from client A 250, where client A 250 has received copy A 255 of webpage 220 from hosting server 210. Indexing system 100 may then determine if any part of copy A 255 received at indexing system 100 is invalid, and if so, remove the invalid part of copy A 255 to provide a verified copy as copy 240. Verified copy 240 thus provides verified webpage content that may be processed to obtain an index of the verified webpage content which can be stored in database 116. Thus, this alternative embodiment analyses copy A 255 received from client A 250 by indexing system 100 to remove any invalid or modified portion of copy A 255 to leave copy 240 which is assumed to be a verified copy of webpage 220.

An indexing system may utilize a plurality of client terminals each provided with installed software to assist perform indexing of the content of a copy of a webpage. The indexing system may request at least one client terminal to return properties of a specified address (i.e. URL). The one or more properties can include, but are not limited to:

1. Partial contents of one or more webpages;
2. Complete contents of one or more webpages;
3. One or more references to other webpages (i.e. links);
4. A check sum of one or more webpages (i.e. CRC);
5. A cryptographic hash of one or more webpages (i.e. MD5, SHA variance); and/or
6. One or more keywords within a one or more webpages, and/or the frequency of such keywords within the one or more webpages.

When the indexing system is crawling or searching a network, for example the Internet, and the indexing system locates one or more webpages of interest, the indexing system may download the contents of a webpage and request a number of client terminals to also download the contents of the webpage.

Alternatively, the indexing system may simply request certain webpage properties from one or more client terminals and compare the properties to properties of the webpage obtained by the indexing system itself downloading a webpage. If certain properties, such as for example a CRC or cryptographic hash, do not match between copies obtained by one or more client terminals with each other or with the indexing system, then the indexing system may request the complete contents of the webpage from the one or more clients to determine the actual contents that would be visible to a user. The actual contents of the webpage could then be indexed using other known techniques, for example the methods disclosed in the hereinbefore cross-referenced patent application.

The indexing system can ensure the integrity of data received from client terminals by utilizing, for example, one or more of: trusted/secured connections; requesting data from more client terminals than actually required; performing statistical analysis of return data; and/or blocking or preventing access from client terminals which repeatedly return invalid, modified or corrupted data.

The indexing system can use additional techniques to obfuscate the relationship between a web crawler and the indexing system, so as to further reduce the likelihood of any malicious indexed websites from detecting the identity of the crawlers, or that the client terminals utilize automated crawlers, and therefore ensuring the client terminals display accurate content. For example, such non-limiting methods may include:

1. Non-consecutive crawl cycles, i.e not crawling one page continually after another page and by simulating normal user activity and timeframes for web browsing;
2. Using multiple crawlers from different locations and IP addresses to crawl one website, i.e. to reduce the detection of multiple requests from the same IP address;
3. Using geographically disperse crawlers to simulate users from more than one or many geographic regions;
4. Using random HTTP headers, such as random user agent, referrer address language and operating systems;
5. Avoiding the use of robots.txt; and/or
6. Not following links hidden to a user in a normal browser, e.g. white text on a white background.

FURTHER EXAMPLE

The following example provides a more detailed example of a particular method/system. The example is intended to be merely illustrative and not limiting to the scope of the present invention.

Figure 8:
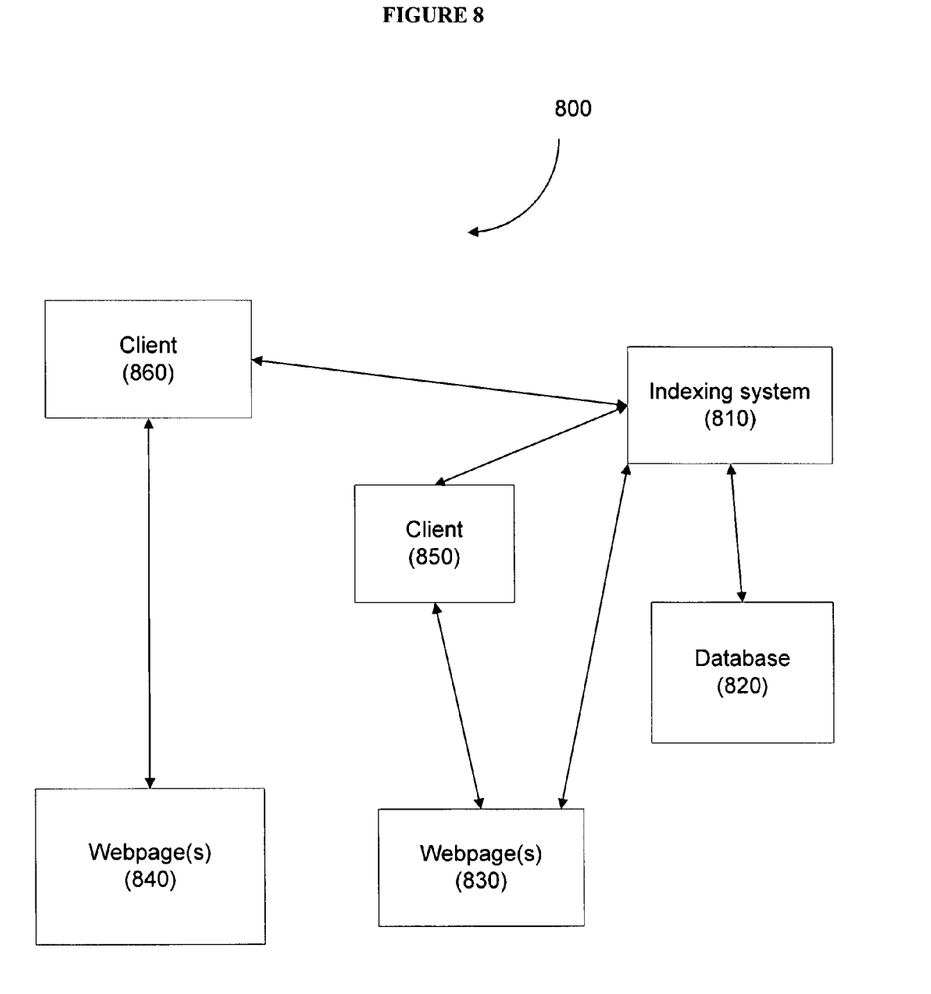
FIG. 8 illustrates an example overview of an alternate system.

Referring to FIG. 8, there is illustrated a system 800 that can be used to index contents of a webpage. The following method steps reference components of system 800.

1. Indexing system 810 finds a page 830 of interest on the network
2. Indexing system 810 may directly download page 830, or
3. Request any number of clients 850, 860 to transfer the contents of page 830 to indexing system 810, or
    a. Clients may be selected from one or a variety of geographic locations
    b. Clients may be selected from one or a variety of connection types
    c. Clients may be selected from one or a variety of platform types (i.e. installed operating system)
    d. Any combination of the above or additional properties utilized in grouping clients
4. Request any number of clients 850, 860 to transfer certain properties of page 830 to indexing system 810
    a. Clients may be selected from one or a variety of geographic locations
    b. Clients may be selected from one or a variety of connection types
    c. Clients may be selected from one or a variety of platform types (i.e. installed operating system)
    d. Any combination of the above or additional properties utilized in grouping clients
5. If indexing system 810 has decided to perform step 2, then;
    a. Indexing system 810 may index contents of page(s) 830, 840 utilizing existing methods, or as yet undisclosed methods
    b. Indexing system 810 may extract certain properties of page(s) 830, 840 for future use, including but not limited to:
        i. Partial contents
        ii. Complete contents
        iii. References to other pages (i.e. "links")
        iv. Checksums of one or more properties or complete data (i.e. "CRC")
        v. Cryptographic hashes of one or more properties or complete data (i.e "MD5", "SHA variants")
        vi. Keywords and/or frequency of said words within the data
6. If indexing system 810 has decided to perform step 3, then;
    a. Indexing system 810 can perform statistical analysis on the data returned by client 850, 860 to determine if any data is invalid or has been tampered with.
    b. Discard any invalid or tampered data as determined above, then
    c. Perform step 5a on the known good data.
7. If indexing system 810 has decided to perform step 4, then:
    a. Indexing system 810 can perform statistical analysis on the data returned by client 850, 860 to determine if any data is invalid or has been tampered with. Statistical analysis may include, but should not be considered to be limited to: natural language analysis, i.e. word/term frequency analysis; word/word group hash or content comparisons; keyword density analysis; and/or readability analysis.
    b. Discard any invalid or tampered data as determined above.
    c. Perform steps 2 and a modified 5b:
        i. Step 5b is adapted to extract the same properties from data returned by step 2 as requested from the clients at step 4.
    d. Compare determined properties against properties returned by known good clients (determined at step 7a, b)
    e. If the number of non-matching properties exceeds a pre-determined threshold, then
        i. Indexing system 810 proceeds to request actual page contents from some or all of the known good clients (determined at step 7a, b).
        ii. Indexes the contents received by utilizing step 5a.
    f. If the number of non-matching properties does not exceed a pre-determined threshold, then indexing system 810 indexes the contents received from step 2 by utilizing step 5a.

Various forms of the present invention may be implemented as stand-alone software or in combination with other forms of software as a software package. The software can be utilized to perform distributed content indexing across a network such as the Internet. In a specific, but non-limiting, embodiment the software may utilize FreeBSD and Microsoft® Windows®, however, it should be realized various forms of the present invention can be applied to any operating system on any form of terminal including embedded appliances.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The present invention may take the form of an entirely hardware embodiment, an entirely software embodiment, firmware, or an embodiment combining software and hardware aspects.

The invention claimed is:

1. A method of verifying content, the method including the steps of:
    receiving, at an indexing system, a first copy of a webpage from a hosting server;
    processing the first copy, at the indexing system, to obtain first indicating data including one or more properties of the first copy;
    receiving second indicating data from a first client terminal, the second indicating data obtained by processing, at the first client terminal, a second copy of the webpage, the second copy received by the first client terminal from the hosting server, the second indicating data including one or more properties of the second copy;
    comparing, at the indexing system, the first indicating data with the second indicating data;
    determining that the first copy is verified when a number of non-matching properties between the first indicating data and the second indicating data does not exceed a threshold number;
    determining that the first copy is not verified when the number of non-matching properties between the first indicating data and the second indicating data exceeds a threshold number;
    upon determining that the first copy is not verified, receiving third indicating data from a second client terminal, the third indicating data obtained by processing, at the second client terminal, a third copy of the webpage, the third copy received at the second client terminal from the hosting server, the third indicating data including one or more properties of the third copy of the webpage;
    determining whether the first copy of the webpage received by the indexing system is verified or not verified based on a comparison between the first indicating data and the third indicating data; and
    upon determining that the first copy is verified, indexing content of the webpage.

2. The method as claimed in claim 1, wherein the content is webpage content.

3. The method as claimed in claim 1, wherein the comparison involves determining the number of matching properties between the first indicating data and the second indicating data.

4. The method as claimed in claim 1, wherein if the first copy is determined to be verified, the contents of the first copy are indexed.

5. The method as claimed in claim 1, wherein the first indicating data includes an index of the contents of the first copy, and if the first copy is determined to be verified, then the index is considered verified.

6. The method as claimed in claim 1, wherein the first indicating data or the second indicating data are at least partially obtained by one or more of: performing natural language analysis; performing word frequency analysis; performing a word hash; performing a word group hash; performing content comparisons; performing keyword density analysis; and performing readability analysis.

7. The method as claimed in claim 1, further including determining if part of the first copy is invalid, and if so, removing the invalid part of the first copy to provide a verified copy of the webpage.

8. The method as claimed in claim 7, further including indexing the verified copy.

9. The method as claimed in claim 2, wherein the one or more properties of the first copy or the second copy at least partially include one or more of the group: partial contents of a webpage; complete contents of a webpage; links to other webpages; a check sum of the webpage; a cryptographic hash of the webpage; and a frequency of at least one keyword within the webpage.

10. A system for verifying content, comprising:
    a processor;
    memory in electronic communication with the processor;
    the processor configured to:
        receive a first copy of a webpage from a hosting server;
        process the first copy to obtain first indicating data including one or more properties of the first copy;
        receive second indicating data from a first client terminal, the second indicating data obtained by processing, at the first client terminal, a second copy of the webpage, the second copy received by the client terminal from the hosting server, the second indicating data including one or more properties of the second copy;
        compare the first indicating data with the second indicating data;
        determine that the first copy is verified when a number of non-matching properties between the first indicating data and the second indicating data does not exceed a threshold number;
        determine that the first copy is not verified when the number of non-matching properties between the first indicating data and the second indicating data exceeds a threshold number;
        upon determining that the first copy is not verified, receive third indicating data from a second client terminal, the third indicating data obtained by processing, at the second client terminal, a third copy of the webpage, the third copy received by the second client terminal from the hosting server, the third indicating data including one or more properties of the third copy of the webpage;
        determining whether the first copy of the webpage received by the indexing system is verified or not verified based on a comparison between the first indicating data and the third indicating data; and
        upon determining that the first copy is verified, indexing content of the webpage.

11. The system as claimed in claim 10, wherein the content is webpage content.

12. The system as claimed in claim 10, also including a database to store indexed contents of the first copy if verified.

13. The system as claimed in claim 10, wherein the second indicating data is obtained by the at least one processing system receiving the second indicating data from the client terminal that processes the second copy.

14. A computer program product for verifying webpage content, the computer program product comprising a non-transitory storage device having instructions thereon, the instructions comprising:

code programmed to receive, at an indexing system, a first copy of a webpage from a hosting server;

code programmed to process the first copy, at the indexing system, to obtain first indicating data including one or more properties of the first copy;

code programmed to receive second indicating data from a first client terminal, the second indicating data obtained by processing, at the first client terminal, a second copy of the webpage, the second copy received by the first client terminal from the hosting server, the second indicating data including one or more properties of the second copy;

code programmed to compare, at the indexing system, the first indicating data with the second indicating data;

code programmed to determine that the first copy is verified when a number of non-matching properties between the first indicating data and the second indicating data does not exceed a threshold number;

code programmed to determine that the first copy is not verified when the number of non-matching properties between the first indicating data and the second indicating data exceeds a threshold number;

upon determining that the first copy is not verified, code programmed to receive third indicating data from a second client terminal, the third indicating data obtained by processing, at the third client terminal, a third copy of the webpage, the third copy received at the third client terminal from the hosting server, the third indicating data including one or more properties of the third copy of the webpage code programmed to determine whether the first copy of the webpage received by the indexing system is verified or not verified based on a comparison between the first indicating data and the third indicating data; and upon determining that the first copy is verified, code programmed to index content of the webpage.

\* \* \* \* \*